United States Patent
Lina

(10) Patent No.: US 9,830,532 B1
(45) Date of Patent: Nov. 28, 2017

(54) OBJECT DETECTION IN IMAGES USING DISTANCE MAPS

(71) Applicant: MATROX ELECTRONIC SYSTEMS LTD., Dorval (CA)

(72) Inventor: Arnaud Lina, Montreal (CA)

(73) Assignee: MATROX ELECTRONIC SYSTEMS LTD., Dorval, Quebec (CA)

( * ) Notice: Subject to any disclaimer, the term of this patent is extended or adjusted under 35 U.S.C. 154(b) by 30 days.

(21) Appl. No.: 14/466,564

(22) Filed: Aug. 22, 2014

(51) Int. Cl.
  *G06K 9/62* (2006.01)
  *G06K 9/34* (2006.01)
  *G06K 9/42* (2006.01)
  *G06T 7/00* (2017.01)

(52) U.S. Cl.
  CPC ............ *G06K 9/6215* (2013.01); *G06K 9/34* (2013.01); *G06K 9/42* (2013.01); *G06T 7/0065* (2013.01); *G06T 7/0095* (2013.01); *G06T 2207/20048* (2013.01); *G06T 2207/20112* (2013.01)

(58) Field of Classification Search
  None
  See application file for complete search history.

(56) References Cited

U.S. PATENT DOCUMENTS

| | | |
|---|---|---|
| 6,249,779 B1 | 6/2001 | Hitt |
| 7,239,751 B1 | 7/2007 | Amador |
| 8,009,879 B2 | 8/2011 | Iwai et al. |
| 8,332,149 B2 | 12/2012 | Oohashi et al. |
| 8,483,489 B2 * | 7/2013 | Van Beek et al. ............ 382/217 |
| 8,515,158 B2 | 8/2013 | Bober et al. |
| 8,774,510 B2 | 7/2014 | Xu et al. |
| 2002/0041705 A1 * | 4/2002 | Lin ....................... G06K 9/3241 382/165 |
| 2012/0082385 A1 * | 4/2012 | Xu ......................... G06K 9/6857 382/199 |
| 2013/0251269 A1 * | 9/2013 | Chehaiber ..................... 382/197 |
| 2015/0003741 A1 * | 1/2015 | Zhang et al. ................. 382/199 |
| 2015/0054975 A1 * | 2/2015 | Emmett et al. ............ 348/220.1 |

OTHER PUBLICATIONS

Gavrila, http://http://www.gavrila.net/Research/Chamfer_System/chamfer_system.html, 2010.*
Jeng et al., "Fast Generalized Hough Transform", Pattern Recognition Letters, vol. 11, Issue 11, Nov. 1990, p. 725-733, (Abstract only).
Grauman et al. "Visual Object Recognition", Synthesis Lectures on Computer Vision # 1, 2011, p. 1-172.
Jeng et al., "Fast Generalized Hough Transform", Pattern Recognition Letters, vol. 11, Issue 11, Nov. 1990, p. 725-733.

* cited by examiner

*Primary Examiner* — Gandhi Thirugnanam
*Assistant Examiner* — Jiangeng Sun
(74) *Attorney, Agent, or Firm* — Norton Rose Fulbright Canada LLP

(57) ABSTRACT

There is described herein a method and system for detecting, in a segmented image, the presence and position of objects with a dimension greater than or equal to a minimum dimension. The objects exhibit a property whereby a distance map of the object at a first scale and a distance map of the object at a second scale greater than the first scale differ by a constant value over a domain of the distance map of the object at the first scale. A distance map of a model object is compared to a distance map of a target object using a similarity score that is invariant to an offset.

27 Claims, 13 Drawing Sheets

OBJECT DETECTION IN IMAGES USING DISTANCE MAPS

TECHNICAL FIELD

The present invention relates to object detection in images, and more particularly, to the detection of objects such as, but not limited to, circles and regular polygons.

BACKGROUND OF THE ART

In computer vision, machine vision and image processing, object recognition is the task of finding and identifying objects in images or video sequences. While humans recognize a multitude of objects in images with little effort, this task is still a challenge for computer vision systems. Many approaches to object recognition have been implemented in order to optimize the technique, whether in terms of processing power, time, or accuracy. Existing object recognition approaches have their limitations. In particular, many object recognition approaches are not "scale invariant." In order to recognize an object at multiple scales, it is necessary to repeat the object recognition process for multiple scale factors, which can be time consuming and processing intensive. With emerging technologies in the fields of robotics, medical imaging, and surveillance, to name just a few, there is a growing need to provide object recognition techniques that can minimize time and processing power while providing results having a high level of accuracy.

SUMMARY

There is described herein a method and system for detecting, in a segmented image, the presence and position of objects with a dimension greater than or equal to a minimum dimension. The objects exhibit a property whereby a distance map of the object at a first scale and a distance map of the object at a second scale greater than the first scale differ by a constant value over a domain of the distance map of the object at the first scale. A distance map of a model object is compared to a distance map of a target object using a similarity score that is invariant to an offset.

In accordance with a first broad aspect, there is provided a method for detecting an object in an image, the object exhibiting a property whereby a distance map of the object at a first scale and a distance map of the object at a second scale greater than the first scale differ by a constant value over a domain of the distance map of the object at the first scale, the method being scale invariant. The method comprises generating a model distance map of a model of the object, the model having a minimum dimension; receiving a segmented target image for detection; applying a distance transform to the segmented target image to generate a target distance map, each pixel location (i, j) in the target distance map having a corresponding distance value; performing pattern matching between the model distance map and the target distance map using a similarity score invariant to a constant offset to generate a similarity map, each pixel location (i, j) in the similarity map having a corresponding similarity value; applying at least one selection criterion to the similarity map and retaining each pixel location (i, j) associated with a similarity value meeting the at least one selection criterion as a position for a detected instance of the object.

In accordance with another broad aspect, there is provided a system for detecting an object in an image, the object exhibiting a property whereby a distance map of the object at a first scale and a distance map of the object at a second scale greater than the first scale differ by a constant value over a domain of the distance map of the object at the first scale, detection of the object being scale invariant. The system comprises a memory, a processor, and at least one application stored in the memory. The application is executable by the processor for generating a model distance map of a model of the object, the model having a minimum dimension; receiving a segmented target image for detection; applying a distance transform to the segmented target image to generate a target distance map, each pixel location (i, j) in the target distance map having a corresponding distance value; performing pattern matching between the model distance map and the target distance map using a similarity score invariant to a constant offset to generate a similarity map, each pixel location (i, j) in the similarity map having a corresponding similarity value; applying at least one selection criterion to the similarity map and retaining each pixel location (i, j) associated with a similarity value meeting the at least one selection criterion as a position for a detected instance of the object.

In accordance with yet another broad aspect, there is provided a computer readable medium having stored thereon program code executable by a processor for detecting an object in an image, the object exhibiting a property whereby a distance map of the object at a first scale and a distance map of the object at a second scale greater than the first scale differ by a constant value over a domain of the distance map of the object at the first scale, detection of the object being scale invariant. The program code is executable for generating a model distance map of a model of the object, the model having a minimum dimension; receiving a segmented target image for detection; applying a distance transform to the segmented target image to generate a target distance map, each pixel location (i, j) in the target distance map having a corresponding distance value; performing pattern matching between the model distance map and the target distance map using a similarity score invariant to a constant offset to generate a similarity map, each pixel location (i, j) in the similarity map having a corresponding similarity value; applying at least one selection criterion to the similarity map and retaining each pixel location (i, j) associated with a similarity value meeting the at least one selection criterion as a position for a detected instance of the object.

For illustrative purposes, the examples presented herein use a circle as the object to be detected. However, the method and system may be applied to any object having the property that a distance map of the object at a first scale and a distance map of the object at a second scale greater than the first scale differ by a constant value over a domain of the distance map of the object at the first scale. This property is referred to herein as the "distance map property."

BRIEF DESCRIPTION OF THE DRAWINGS

Further features and advantages of the present invention will become apparent from the following detailed description, taken in combination with the appended drawings, in which:

FIG. 1b illustrates a distance map obtained from the segmented image of FIG. 1a;

FIG. 2b illustrates a distance map obtained from the segmented image of FIG. 2a;

FIG. 7b is a binarized version of the grayscale target image of FIG. 7a;

FIG. 9a is an exemplary similarity map with retained pixel locations of center positions for detected objects in the grayscale target image of FIG. 7a;

It will be noted that throughout the appended drawings, like features are identified by like reference numerals.

DETAILED DESCRIPTION

Referring to FIGS. 1 to 9, an exemplary method for detecting an object in an image will be described. The method may be applicable in many fields, such as but not limited to, surveillance, industrial automation and quality assurance, and medical imaging. For example, the method may be used in a machine vision system to locate objects in a station of an industrial production line. The located objects may then be automatically picked and placed by robotic equipment or may be further inspected, measured, sorted or counted by the machine vision system. The method may also be used to locate cells in medical imaging and biomedical engineering applications, or may be used to locate crystal particles in materials analysis. Other possible applications of the method described herein will be readily understood.

The method may be used to detect in images various objects that have the "distance map property". For example, many objects having rotational symmetry, such as regular n-sided polygons (convex or star) and circles, exhibit this property. Other objects, such as a right triangle, also exhibit this property. For objects that exhibit the property, a distance map of a first such object at a first scale and a distance map of a second such object at a second scale greater than the first scale differ by a constant value over the domain of the distance map of the smaller object. This principle is illustrated in FIGS. 1a-1c and 2a-2c.

Figure 1A:
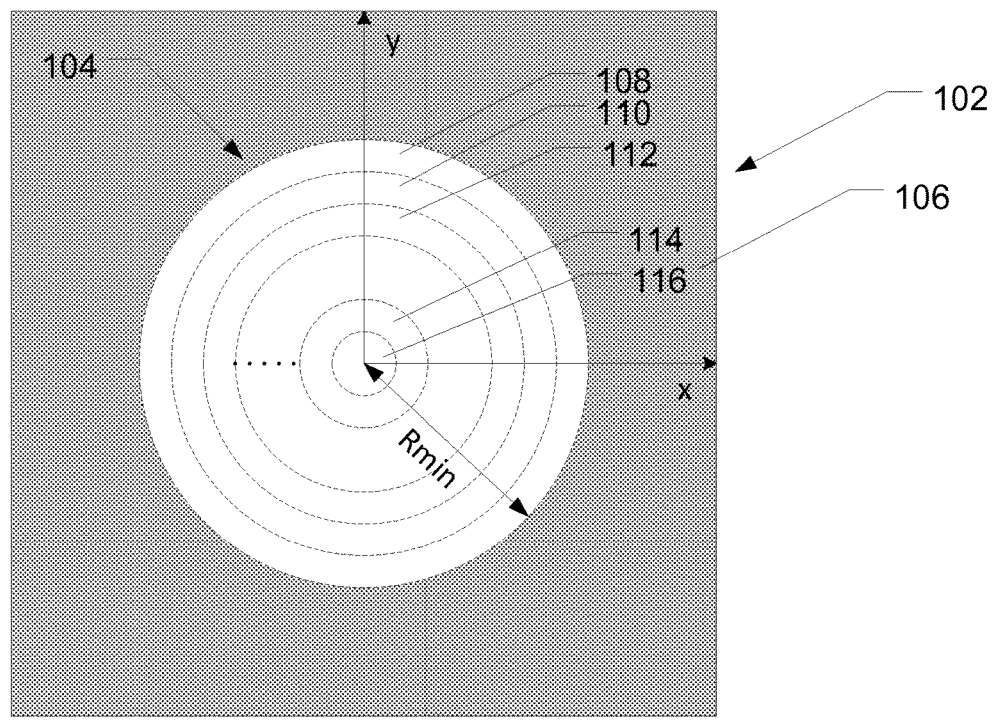
FIG. 1a illustrates a segmented image of a circle of radius $R_{min}$.

FIG. 1a illustrates a segmented image 102 of a circle (i.e., a solid circle or disk) having a radius denoted $R_{min}$. In this example, the segmented image is a binary image in which foreground pixels 104 forming the circle have a first binary value (shown in white) and background pixels 106 have a second binary value (shown in grey.) A coordinate system with axes x and y is positioned at the center of the circle.

Figure 1B:
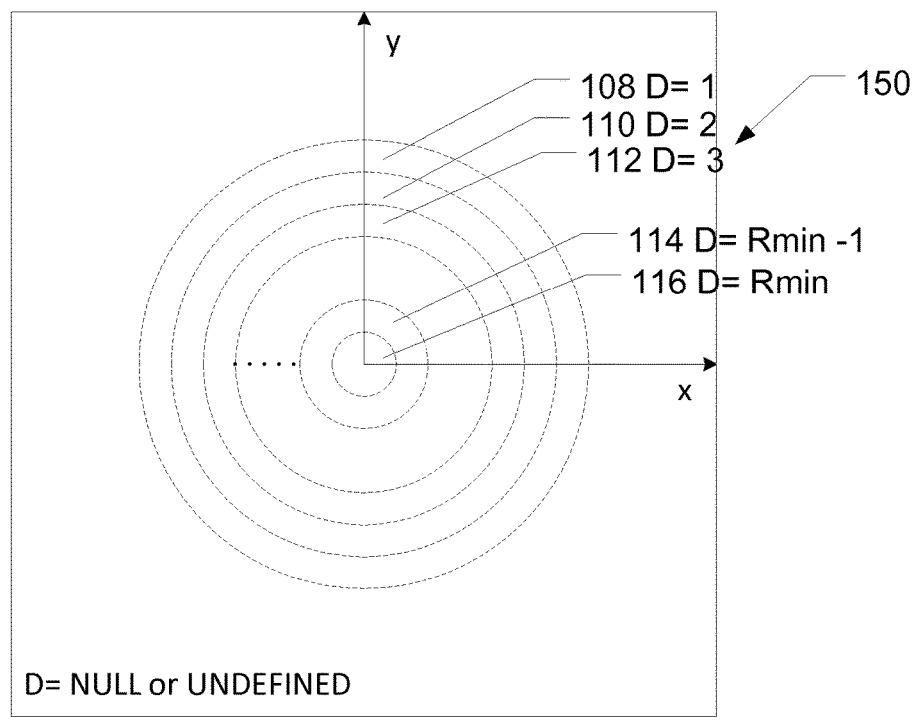

FIG. 1b schematically illustrates a distance map 150 obtained by applying a distance transform to the segmented image 102 of FIG. 1a. A distance map, also known as a distance transform or distance field, is a derived representation of a segmented image. The distance map of a segmented image assigns each foreground pixel in the segmented image a value equal to the distance in pixels between the respective foreground pixel and the closest background pixel in the segmented image. The distance map may assign background pixels in the segmented image a value of zero or "undefined." In the segmented image 102, a first "ring" of foreground pixel locations 108 centered at the center of the circle 104 and forming the boundary of the circle 104 are each at a distance of one pixel from a closest background pixel and are therefore assigned a distance value of "1" in the distance map 150.

In the segmented image 102, a second "ring" of foreground pixel locations 110 are each at a distance of two pixels from a closest background pixel and are therefore assigned a distance value of "2" in the distance map 150. In the segmented image 102, a third "ring" of foreground pixel locations 112 are each at a distance of three pixels from a closest background pixel and are therefore assigned a distance value of "3" in the distance map 150, and so forth. The foreground pixel location (or set of foreground pixel locations) 116 at the center of the circle 104 are each at a distance in pixels equal to the radius $R_{min}$ of the circle 104. Thus, the distance map 150 is characterized by a set of concentric rings centered at the center of the circle 104 and whose distance values decrease linearly (in increments of one pixel) as you move radially outward from the center of the circle 104, where the distance value is equal to the radius $R_{min}$, to the boundary of the circle 104 where the distance value is "1".

Figure 1C:
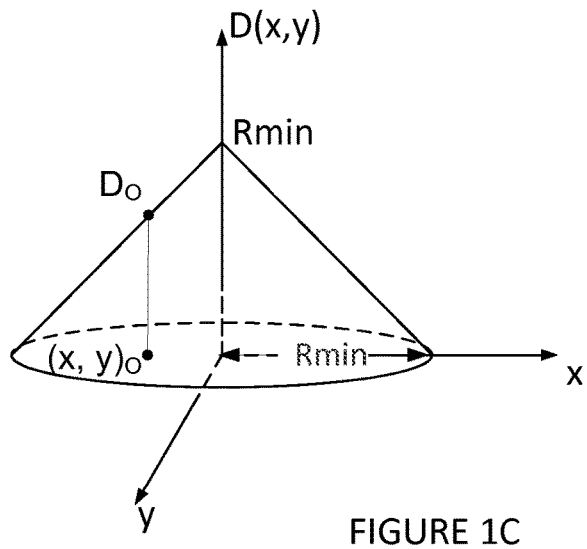
FIG. 1c illustrates a three-dimensional representation of the distance map of a circle having a radius $R_{min}$.

FIG. 1C illustrates the distance map 150 of FIG. 1b represented in three dimensions. The axis D(x,y) corresponds to the distance value assigned in the distance map to a pixel location (x, y) in the segmented image. For example, a particular pixel location $(x, y)_o$ in the segmented image has a distance value of $D_o$ in the distance map. Represented in three dimensions, the distance map of a circle of radius $R_{min}$ forms a cone (more precisely, a "right circular" cone) having a circular base of radius equal to the radius $R_{min}$ and centered at the center of the circle and having an axis perpendicular to the base and passing through the apex at a value equal to the radius $R_{min}$.

Figure 2C:
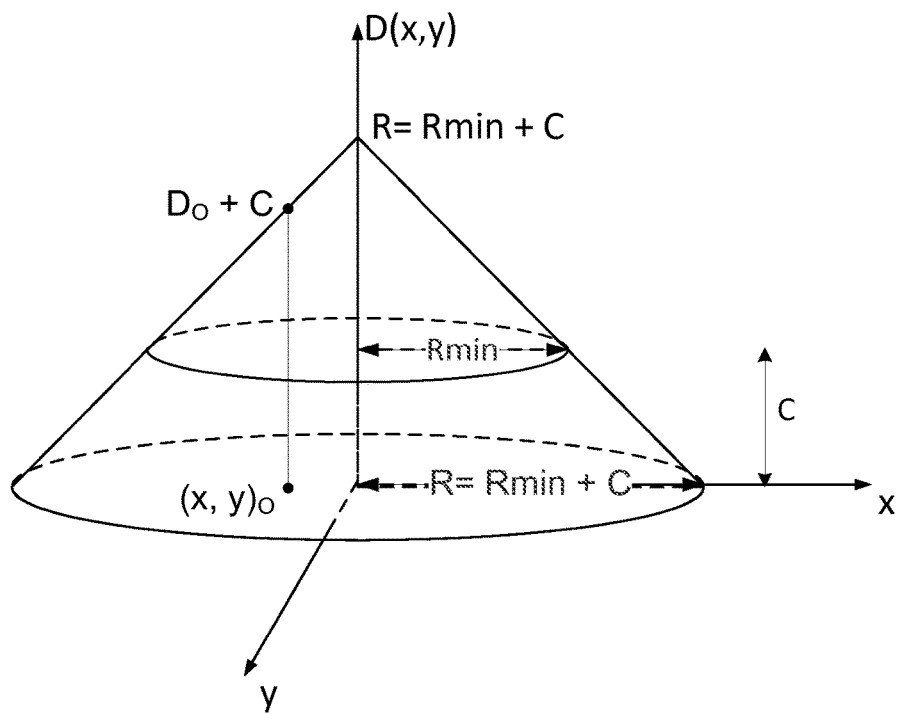
FIG. 2c illustrates a three-dimensional representation of the distance map of a circle having a radius R larger than $R_{min}$.
Figure 2A:
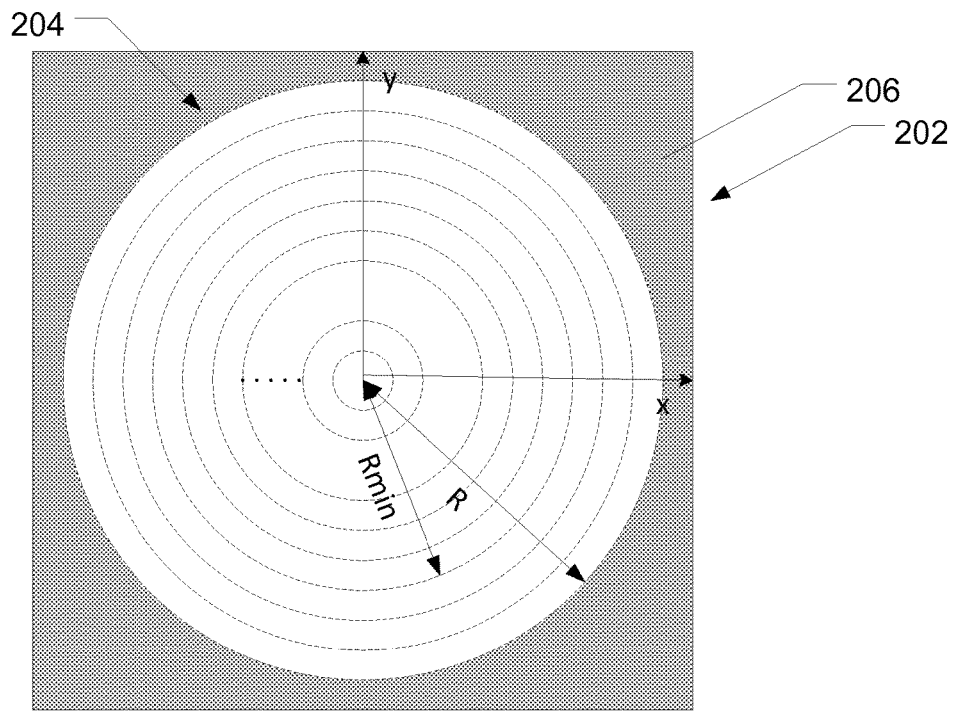
FIG. 2a illustrates a segmented image of a circle of radius R larger than $R_{min}$.

FIG. 2a illustrates a segmented image 202 of a circle having a radius denoted R that is larger than the radius $R_{min}$. Again, the segmented image is a binary image in which foreground pixels 204 forming the circle have a first binary value (shown in white) and background pixels 206 have a second binary value (shown in grey.)

Figure 2B:
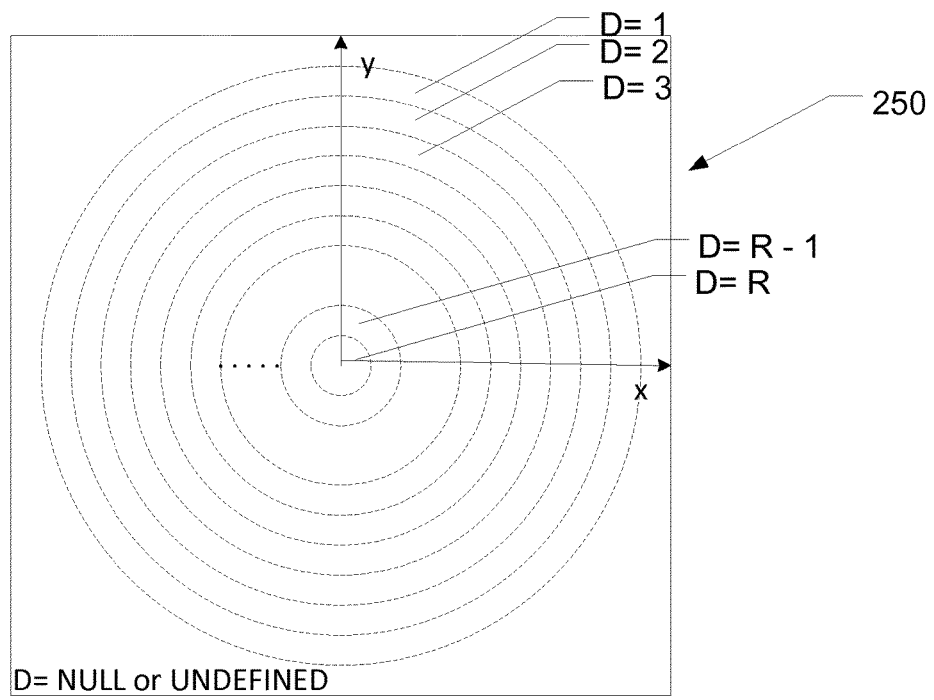

FIG. 2b schematically illustrates a distance map 250 obtained by applying a distance transform to the segmented image 202 of FIG. 2a. Like the distance map 150, the distance map 250 is characterized by a set of concentric rings centered at the center of the circle 204 and whose distance values decrease linearly (in increments of one pixel) as you move radially outward from the center of the circle 204 to the boundary of the circle 204. However, in the distance map 250, the distance values decrease linearly from a maximum distance value equal to R, the radius of the larger circle 204.

FIG. 2c illustrates the distance map 250 of FIG. 2b represented in three dimensions. Again, the distance map forms a cone (i.e., a right circular cone) having a circular base centered at the center of the circle and having an axis perpendicular to the base. In addition, the shape of the cone in FIG. 2C (radius $R>R_{min}$) is the same as the shape of the cone in FIG. 1C (radius $R_{min}$). In both cases, the height of the cone is equal to the radius of the base, such that the "slopes" of the cones are the same. However, in FIG. 2C, the radius of the base and the apex correspond to the radius R of the larger circle.

Comparing FIGS. 1c and 2c, we see that over the domain of the distance map of the circle of radius $R_{min}$ (i.e., the set of pixel locations (x, y) within the circle of radius $R_{min}$), the difference between the distance map of the larger circle and the distance map of the smaller circle is a constant value denoted C, where C corresponds to the difference in radius between the larger circle and the smaller circle. For example, a same pixel location $(x, y)_o$ within the domain has a distance value of $D_o$ in the distance map of FIG. 1c and a distance value of $D_o+C$ in the distance map of FIG. 2c. Advantageously, a pattern matching technique that uses a similarity score that is invariant to an offset may be used to detect circles of varying radii that are greater than or equal to a minimum radius $R_{min}$.

Accordingly, a method is proposed to detect, in a segmented image, the presence and position of objects having the "distance map property". A distance map of a model object is compared to a distance map of a target object using a similarity score that is invariant to an offset. The method is thus scale invariant and a single model object of a minimum dimension may be used to detect similar objects having a dimension equal to or greater than the minimum dimension.

Figure 3:
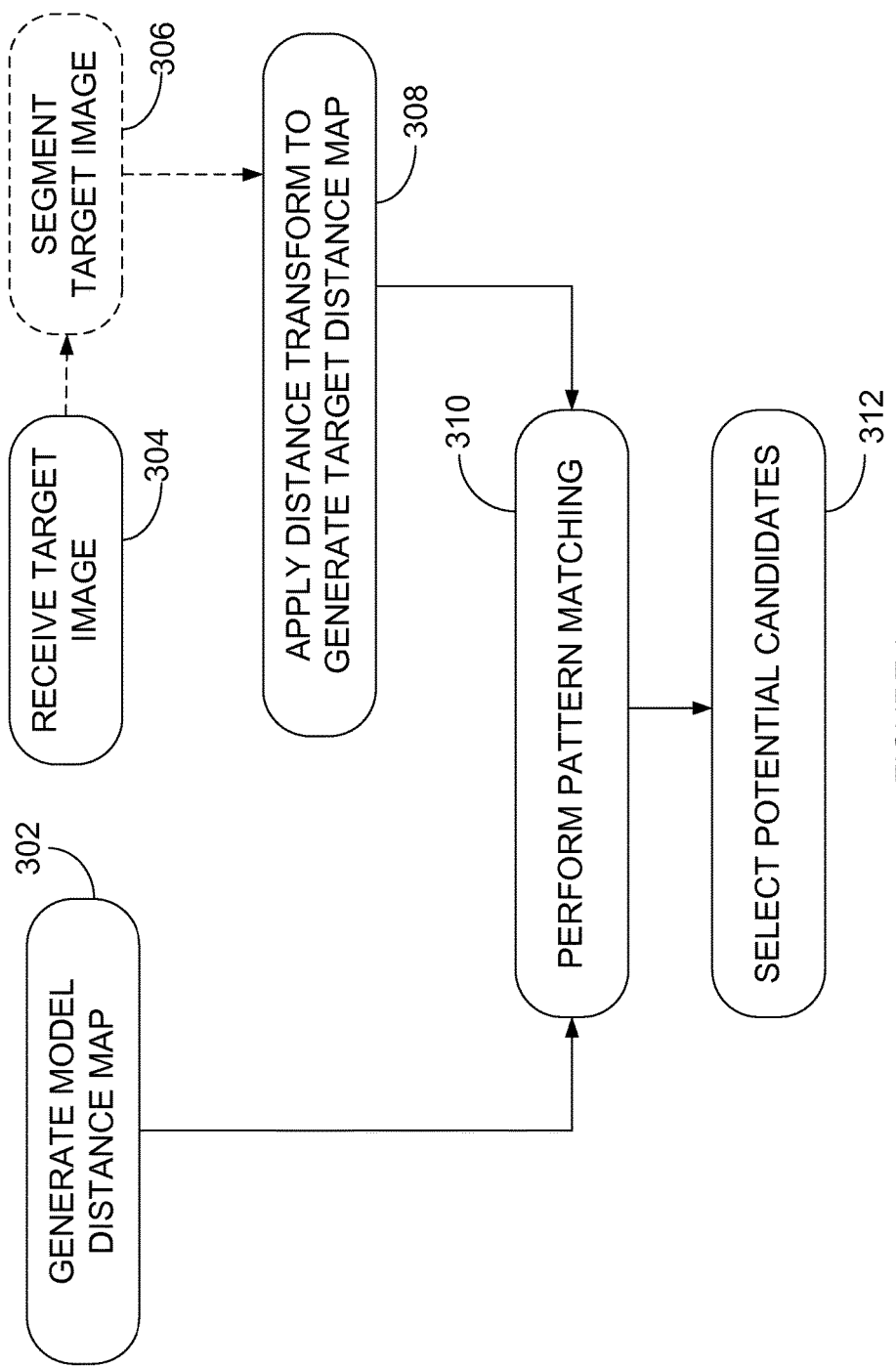
FIG. 3 if a flowchart of an exemplary method for detecting an object in an image.
Figure 4:
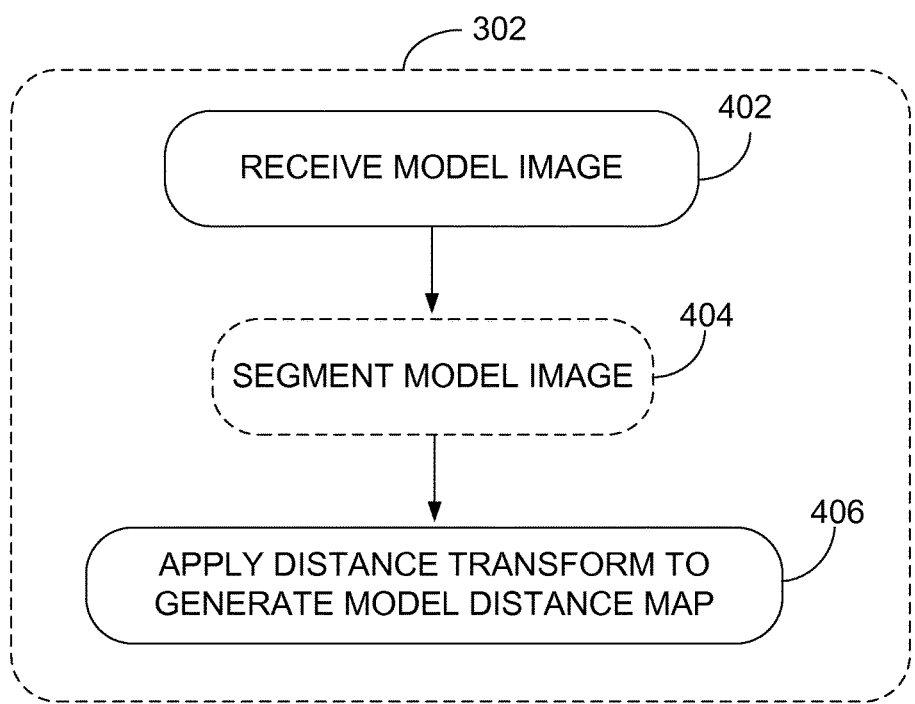
FIG. 4 is a flowchart of an exemplary embodiment for generating a model distance map.

FIG. 3 is a flowchart illustrating an embodiment of the method for detecting an object in an image. The method is based on a model of the object to be detected, the model having a minimum dimension. The model may be provided by the user or may be pre-programmed. As per step 302, a model distance map of the model is generated. FIG. 4 is a flowchart of an exemplary embodiment for generating a model distance map at step 302. In the embodiment of FIG. 4, step 302 of generating a model distance map comprises a step 402 of receiving a model image of the object to be detected. For example, the model image may be an image acquired by an image acquisition device such as a digital camera or may be a computer-generated image. If the model image is a non-segmented image, a step 404 of segmenting the model image may be provided. Various image segmentation techniques may be used to segment the model image at step 404.

As defined herein, a segmented image is an image (binary, grayscale or color) for which foreground pixels, background pixels, or both are identified. In one embodiment, the segmented image is an image whose pixel values identify the foreground pixels and/or background pixels. For example, the segmented image can be a binary image in which foreground pixels have a first binary value (e.g., '1') and background pixels have a second binary value (e.g., '0'). Alternatively, the segmented image can be an image in which foreground pixels have a non-null value and background pixels have a null value. For example, the segmented image can be a grayscale or color image in which all background pixels are set to the null value. In another embodiment, the segmented image may take the form of a non-segmented image (e.g., grayscale or color) together with information identifying the foreground pixels and/or background pixels in the non-segmented image. Various image segmentation techniques may be used to identify foreground pixels and background pixels in a non-segmented image. In one embodiment, the non-segmented image is thresholded according to a global or local thresholding technique. In another embodiment, the edges or contours of objects in the non-segmented image are detected using edge detection techniques. Then, pixels located within the detected edges or contours are identified as foreground pixels and pixels located outside the detected edges or contours are identified as background pixels. Other image segmenting techniques may also be used Returning to FIG. 4, as per step 406, a distance transform may be applied to the segmented model image in order to generate the model distance map. A distance map, also known as a distance transform or distance field, is a derived representation of a segmented image. Generally, the distance map of a segmented image assigns each foreground pixel in the segmented image a value equal to the distance in pixels between the respective foreground pixel and the closest background pixel in the segmented image. The distance map may assign background pixels in the segmented image a value of zero or undefined. The distance in pixels may be the Euclidean distance or may be an approximation such as the "chamfer distance," the "chessboard distance," or the "city block distance," as will be understood by a person skilled in the art.

As described with reference to FIG. 4, the model distance map may be generated from a model image of the object to be detected having a minimum dimension. Alternatively, the model distance map may be generated directly from a set of inputs comprising a minimum dimension and an identification of the shape of the object. If the method is applied to objects of a fixed shape, such as only circles or only squares, then only the minimum dimension is needed to generate the model distance map.

Referring back to FIG. 3, the method for detecting an object comprises a step 304 of receiving a target image. The target image is the image in which the model object is to be detected. In some embodiments, the target image may be a grayscale or color target image, acquired using an image acquisition device such as a digital camera. If the target image is a non-segmented image, a step 106 of segmenting the target image may be provided. Various image segmentation techniques may be used to segment the target image at step 306.

As per step 308, a distance transform is applied to the segmented target image in order to generate a target distance map.

As per step 310, pattern matching is performed between the model distance map and the target distance map. Pattern matching at step 310 generally comprises performing a comparison between the target distance map and the model distance map using a similarity score invariant to a constant offset to generate a similarity map. In the resulting similarity map, each pixel location has a corresponding similarity value. In some embodiments, performing pattern matching between the model distance map and the target distance map includes successively positioning the model distance map at each pixel location in the target distance map and calculating a similarity value for each pixel location.

In some embodiments, pattern matching is performed between the model distance map and the target distance map using a normalized correlation. Using the normalized correlation, the result of the pattern matching is unaffected by linear changes (i.e. constant gain and offset) in the target or model distance values. In one embodiment, the normalized correlation returns a value between "+1" and "−1". A null value indicates no correlation between the model and target. A positive value indicates a degree of correlation between the model and target with a value of "+1" indicating a perfect correlation. A negative value indicates a degree of "anti-correlation" between the model and target with a value of "−1" indicating a perfect anti-correlation. In one embodiment, negative values indicating anti-correlations are set to the null value. In some embodiments, the normalized correlation is squared in order to avoid slow square-root operations. In addition, the result may be converted to a percentage, where 100% represents a perfect match.

In one example, the normalized correlation NC between the model distance map and the target distance map for a pixel location (i, j) in the target distance map is calculated according to the following equation:

$$NC = \frac{N \cdot \sum T \cdot M - \sum T \cdot \sum M}{\sqrt{(\sum M^2 - (\sum M)^2)} \cdot \sqrt{(\sum T^2 - (\sum T)^2)}}$$

in which N represents the number of pixel locations (x, y) in the model distance map (i.e., in the domain of the model distance map), M represents the distance value at a particular pixel location (x,y) in the model distance map, and T represents the distance value at the corresponding pixel location (i+x, j+y) in the target distance map for pixel location (i, j). The summations are performed over all pixel locations (x,y) in the model distance map (i.e., in the domain of the model distance map).

Note that the model distance map and the target distance map may be represented as grayscale images. In this case, a normalized grayscale correlation may be used for performing step 310 of pattern matching.

From the similarity map, a step 312 of selecting potential candidates for the object being detected is performed. The candidates may be selected by applying at least one selection criterion to the similarity map. Each pixel location (i, j) associated with a similarity value that meets the at least one selection criterion may be retained. These retained pixel locations correspond to approximate positions for detected instances (or occurrences) of the object in the target image.

In one embodiment, step 312 comprises first identifying pixel locations corresponding to local extrema in the similarity map and then retaining pixel locations whose similarity values are consistent with a predetermined detection threshold. For example, if the similarity score increases with similarity, applying at least one selection criterion can include first identifying pixel locations corresponding to local maxima in the similarity map and then retaining pixel locations whose similarity values are larger than or equal to (or simply larger than) a predetermined detection threshold. If the similarity score decreases with similarity, applying at least one selection criterion can include first identifying pixel locations corresponding to local mimima in the similarity map and then retaining pixel locations whose similarity values are smaller than or equal to (or simply smaller than) a predetermined detection threshold.

In some embodiments, the at least one selection criterion comprises a number of occurrences of the object. More particularly, how many matches to find may be specified. If only a single match is needed, the required number of occurrences may be set to one. In some embodiments, the at least one selection criterion may comprise an acceptance level. The acceptance level corresponds to the level at which the correlation (or similarity) score between the model distance map and the target distance map is considered a match. If the result of the correlation between the model distance map and the target distance map is less than the acceptance level, they are not considered a match. In some embodiments, the at least one selection criterion may comprise a certainty level. The certainty level is the match score (usually higher than that of the acceptance level) above which the algorithm can assume it has found a very good match and can stop searching the rest of the image for a better one. This at least one selection criterion may be useful when looking for a limited number of occurrences of the object in the target image. In some embodiments, the at least one selection criterion may comprise a search region. Instead of searching the entire region of an image, only a portion of the target image may be searched by defining a search region. The at least one selection criterion may comprise any combination of selection criteria in order to optimize the selection of potential candidates for the object being detected.

In some embodiments, the object detection method of FIG. 3 further comprises, for each pixel location (i, j) retained as a position for a detected instance of the object, determining an approximate dimension for the detected instance based on the distance value corresponding to a center position of the detected instance.

Figure 5:
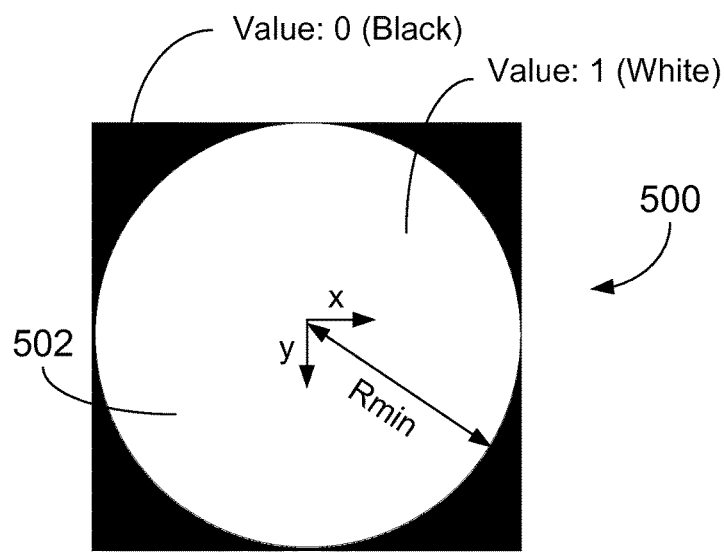
FIG. 5 is an exemplary binary model image.

FIG. 5 illustrates an exemplary segmented model image 500 of a circle 502 having a radius denoted the minimum radius $R_{min}$. In this example, the object to be detected in the target image is a circle having a radius larger or equal to the minimum radius $R_{min}$. In this example, the segmented model image is a binary image in which foreground pixels forming the circle 502 have a value of "1" (white) and background pixels have a value of "0" (black.) A model coordinate system with axes x and y is positioned at the center of the circle 502.

Figure 6:
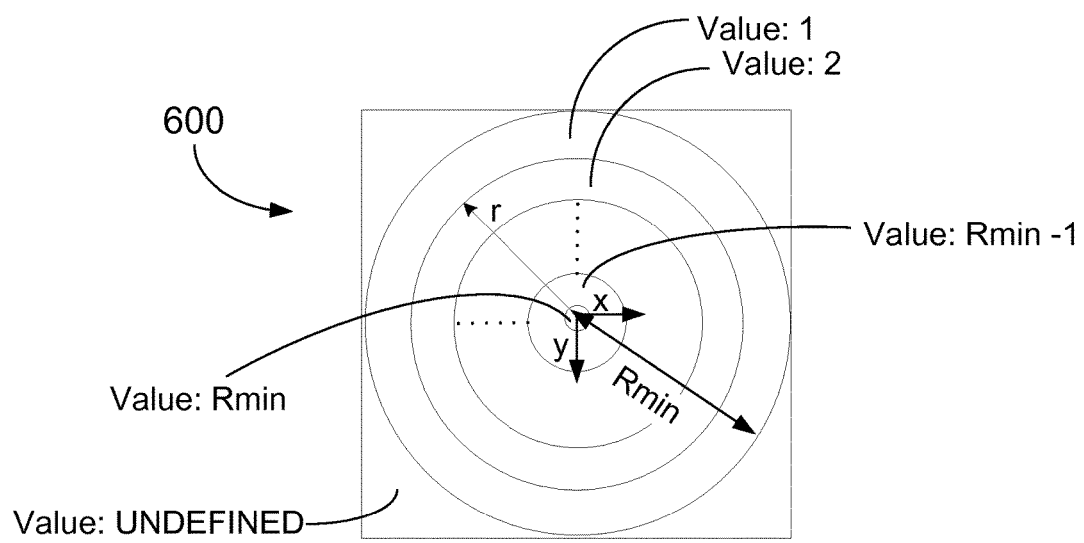
FIG. 6 is an exemplary model distance map of the binary model image of FIG. 5.

FIG. 6 schematically illustrates an exemplary model distance map 600 of the segmented model image 500 of FIG. 5. As explained previously, the distance map of a segmented image assigns each foreground pixel in the segmented image a value equal to the distance in pixels between the respective foreground pixel and the closest background pixel in the segmented image. As a result, in the case of the model image 500 of the circle 502, the distance map 600 assigns each pixel inside the circle 502 in the model image 500a value equal to the distance in pixels to the closest pixel outside the circle 502. The resulting distance map includes a set of concentric circles of pixels having successive distance values. In the distance map 600 of the present example, the pixels inside the circle 502 are assigned values as follows. The pixels found within the boundary of the circle 502 and the first concentric circle are assigned a value of "1". The pixels found within the first concentric circle and the second concentric circle are assigned a value of "2", and so forth. The pixels found within the "$R_{min}$−2" concentric circle and the "$R_{min}$−1" concentric circle are assigned a value of "$R_{min}$−1". The pixels found within the smallest concentric circle are assigned a value of "$R_{min}$".

In some embodiments, and as illustrated, the pixel locations corresponding to background pixels in the model image 500 may be assigned a distance value "undefined" in the model distance map 600. In this case, the model distance map 600 consists of only the set of pixel locations corresponding to foreground pixels in the binary model image (within the boundary of the circle) and their corresponding distance values. This allows the detection of circles with radius equal to $R_{min}$ and of circles with radius larger than $R_{min}$. Alternatively, the pixel locations corresponding to background pixels in the binary model image 500 are assigned a distance value of "0" in the model distance map 600. In this case, the model distance map 600 consists of all pixel locations in the binary model image 500 (i.e., corresponding to both foreground and background pixels) and their corresponding distance values. This allows the detection of circles with radius equal to $R_{min}$, but the detection of circles with radius larger than $R_{min}$ may fail. If the circle to be detected in the target image is of radius larger than $R_{min}$, the null distance values of these background pixel locations in the model distance map will not correlate with corresponding distance values in the target distance map which are non-null. This will reduce the similarity score such that detection of the larger circle may fail.

Figure 7A:
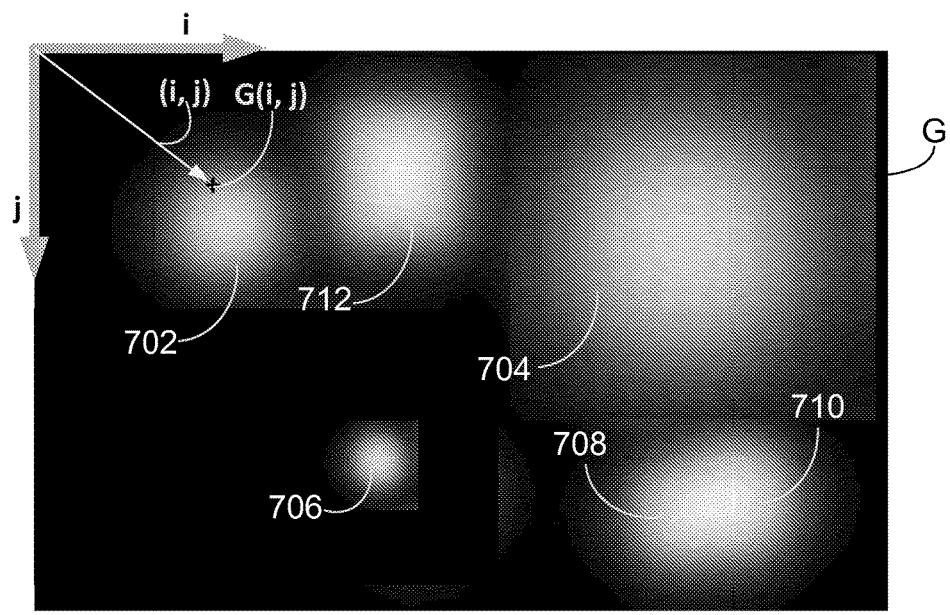
FIG. 7a is an exemplary grayscale target image.

FIG. 7a is an exemplary grayscale target image G in which objects are to be detected. The grayscale target image G includes various objects including circular objects (or circles) 702, 704, 706, 708, and 710 of varying sizes and a rectangular object (or rectangle) 712. In this example, circles 702, 704, 708 and 710 have a radius greater than or equal to the radius $R_{min}$ while circle 706 has a radius smaller than the radius $R_{min}$. Circles 708 and 710 are partially overlapped. In this example, a target coordinate system with axes i and j is positioned at the top left hand corner of grayscale target image G. Each pixel location (i, j) in the grayscale target image G has an associated grayscale intensity value G(i, j).

Figure 7B:
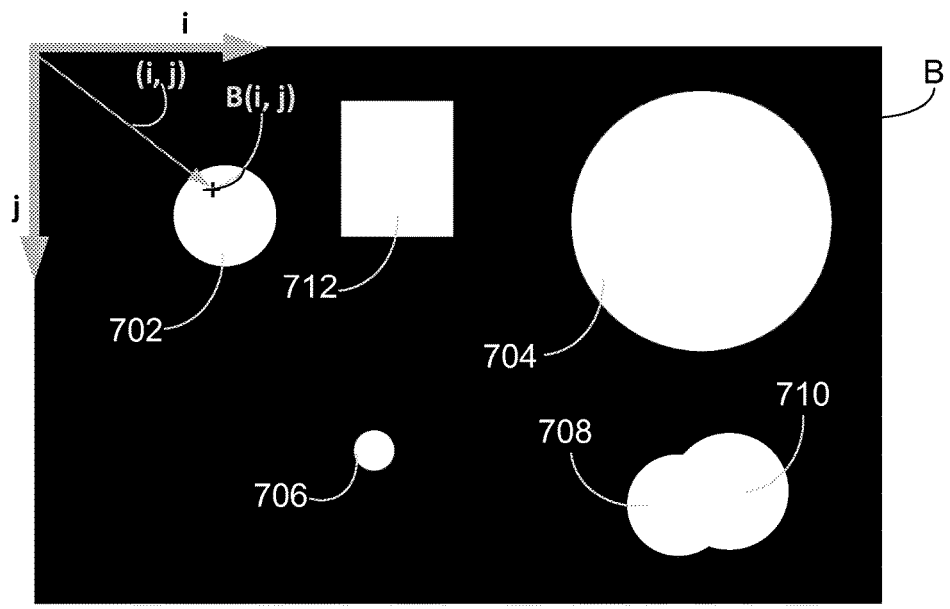

FIG. 7b is an exemplary binary target image B obtained by segmenting the grayscale target image G. In binary target image B, each pixel location (i, j) has an associated binary value B(i, j) obtained by thresholding the grayscale intensity value G(i, j) at the corresponding pixel location (i, j) in the grayscale target image G (e.g., using a global or local thresholding technique.) In binary target image B, foreground pixels belonging to objects have a binary value of 1 (white) while background pixels outside the objects have a binary value of 0 (black.) As a result, circles 702, 704, 706, 708, and 710 and square 712 are more clearly defined in binary target image B. Binary target image B is an example of a segmented target image to which a distance transform may be applied in order to generate a target distance map, as per step 308 of the method of FIG. 3.

Figure 8:
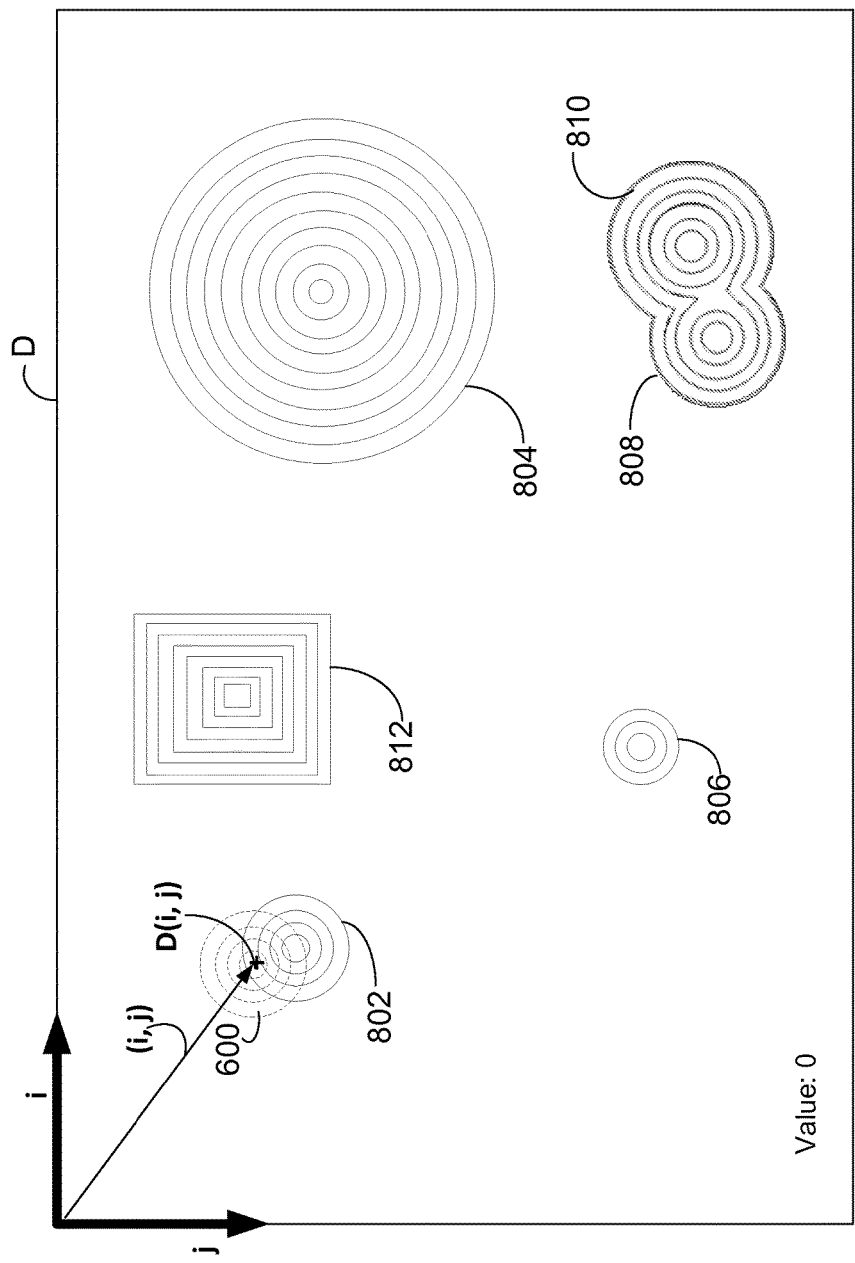
FIG. 8 is an exemplary target distance map of the binary target image of FIG. 7b.

FIG. 8 illustrates an exemplary target distance map D obtained by applying a distance transform to binary target image B. Each pixel location (i, j) in the target distance map D has an associated distance value D(i, j). If the pixel location (i, j) corresponds to a background pixel in binary target image B (i.e., B(i, j) is zero), the distance value D(i, j) is zero. If the pixel location (i, j) corresponds to a foreground pixel in binary target image B (i.e., B(i, j) is one), the distance value D(i, j) is the distance in pixels from the pixel location (i, j) to the closest background pixel in binary target image B. Like the model distance map 600, the portions 802, 804 and 806 of the target distance map D corresponding to circles 702, 704 and 706 of varying radius are each characterized by a set of concentric rings centered at the center of the circle and whose distance values decrease linearly as you move radially outward from the center of the circle. The portions 808 and 810 of the target distance map D corresponding to overlapping circles 708 and 710 are characterized by a set of partial concentric circles. The portion 812 corresponding to rectangle 712 is characterized by a set of concentric rectangles.

For illustrative purposes, the model distance map 600 is shown centered at pixel location (i, j) in the target distance map D. When performing pattern matching between the model distance map 600 and the target distance map D, the model distance map 600 is successively positioned at each pixel location (i, j) in target distance map D and a similarity value S(i, j) is calculated for each pixel location (i, j).

Figure 9A:
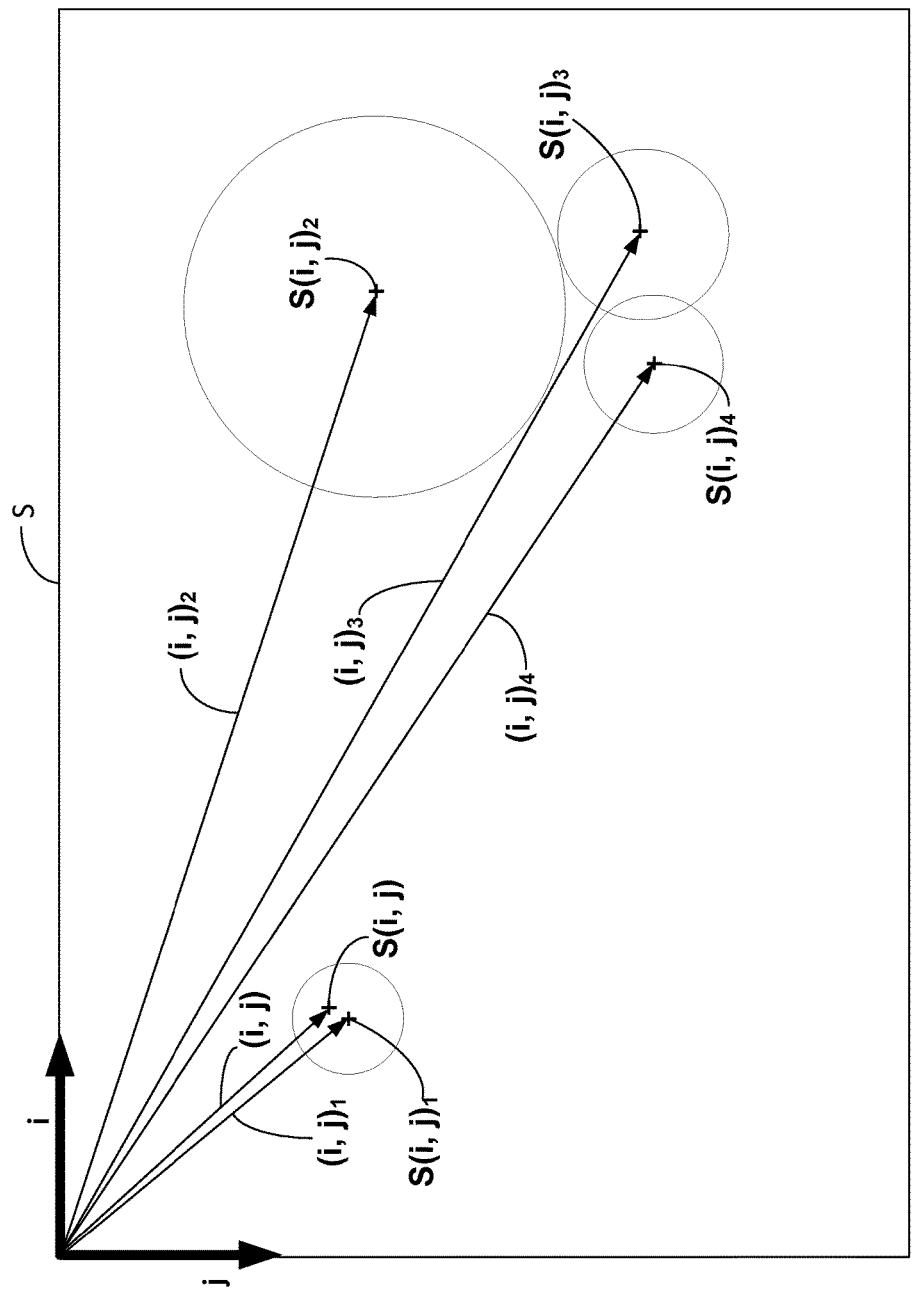

FIG. 9a is an exemplary similarity map S obtained by performing pattern matching between the model distance map 600 and the target distance map D. Each pixel location (i, j) in the similarity map S has an associated similarity value S(i, j) representing the degree of similarity between the values of the target distance map D at/around pixel location (i, j) and the corresponding values of the model distance map 600 superimposed at pixel location (i, j) in the target distance map D (i.e., with the model coordinate system centered at pixel location (i, j)).

Pattern matching is performed using a similarity score invariant to a constant offset, such as normalized correlation. As a result, the similarity map will include high similarity values $S(i, j)_1$, $S(i, j)_2$, $S(i, j)_3$, and $S(i, j)_4$ at pixel locations $(i, j)_1$, $(i, j)_2$, $(i, j)_3$, and $(i, j)_4$ corresponding to the centers of circles 702, 704, 708 and 710 having a radius greater than or equal to the radius $R_{min}$. The similarity values $S(i, j)_1$ and $S(i, j)_2$ corresponding to full circles 702 and 704 will be high, 100% for example. The similarity values $S(i, j)_3$ and $S(i, j)_4$ corresponding to overlapping circles 708 and 710 will be lower, 75% for example. In this example, a detection threshold is set to 70%. As a result, all four pixel locations $(i, j)_2$, $(i, j)_2$, $(i, j)_3$, and $(i, j)_4$ are retained as center positions for detected instances of the object. In this example, pixel locations corresponding to circle 706 having a radius smaller than $R_{min}$ and rectangle 712 have similarity values below the detection threshold and are not retained.

Figure 9B:
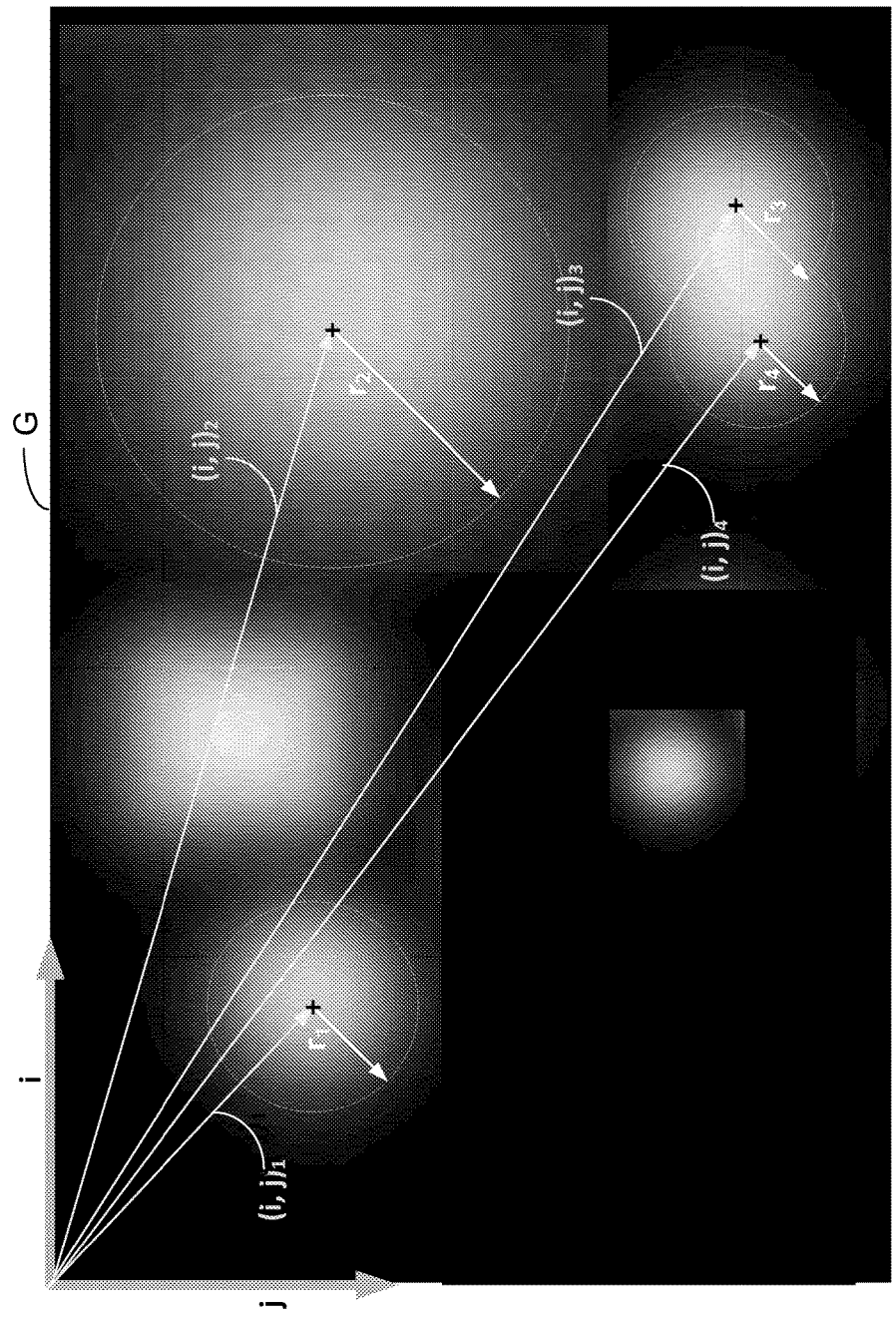
FIG. 9b is the grayscale target image of FIG. 7a overlaid with the results of the detection.

FIG. 9B illustrates the grayscale target image G in which the pixel locations $(i, j)_1$, $(i, j)_2$, $(i, j)_3$, and $(i, j)_4$ retained as center positions for detected instances of the object are identified. In some embodiments, the method may comprise determining an approximate dimension for a detected instance based on the distance value corresponding to the center position of the detected instance. In this example, an approximate radius $r_1$ for the detected circle centered at pixel locations $(i, j)_1$ is set to the distance value $D(i, j)_1$ at the corresponding pixel location $(i, j)_1$ in target distance map D. Similarly, approximate radii $r_2$, $r_3$, and $r_4$ for the detected circles centered at pixel locations $(i, j)_2$, $(i, j)_3$, and $(i, j)_4$ are set to corresponding distance values $D(i, j)_2$, $D(i, j)_3$, and $D(i, j)_4$, respectively.

Note that the circle lends itself well to the method due to its perfectly symmetrical shape, invariant to both reflection and rotation. For other objects, the method will be able to recognize the object in the target image at certain orientations only. For example, if the object has no rotational symmetry (e.g., a right triangle), the method will be able to recognize the object at the same orientation only (e.g., with a degree of tolerance). If the object has rotational symmetry of order N (e.g., an N-sided regular polygon), the method will be able to recognize the object at N orientations (e.g., with a degree of tolerance). In order to recognize the object at a greater number of orientations, it may be necessary to repeat the pattern matching process for multiple orientations of the model or target image. In some embodiments, a first model distance map is generated for a first orientation of the model and a second model distance map is generated for a second orientation of the model. Then, pattern matching is performed between the first model distance map and the target distance map to generate a first similarity map and pattern matching is performed between the second model distance map and the target distance map to generate a second similarity map. Finally, a selection criterion is applied to the first similarity map and each pixel location (i, j) meeting the selection criterion is retained as a position for a detected instance of the object at the first orientation, and a selection criterion is applied to the second similarity map and each pixel location (i, j) meeting the selection criterion is retained as a position for a detected instance of the object at the second orientation. This approach can be extended to a greater number of orientations of the model, as required by the expected range of orientations of the object in the target image and based on the degree of rotational symmetry of the object to be detected.

Figure 10:
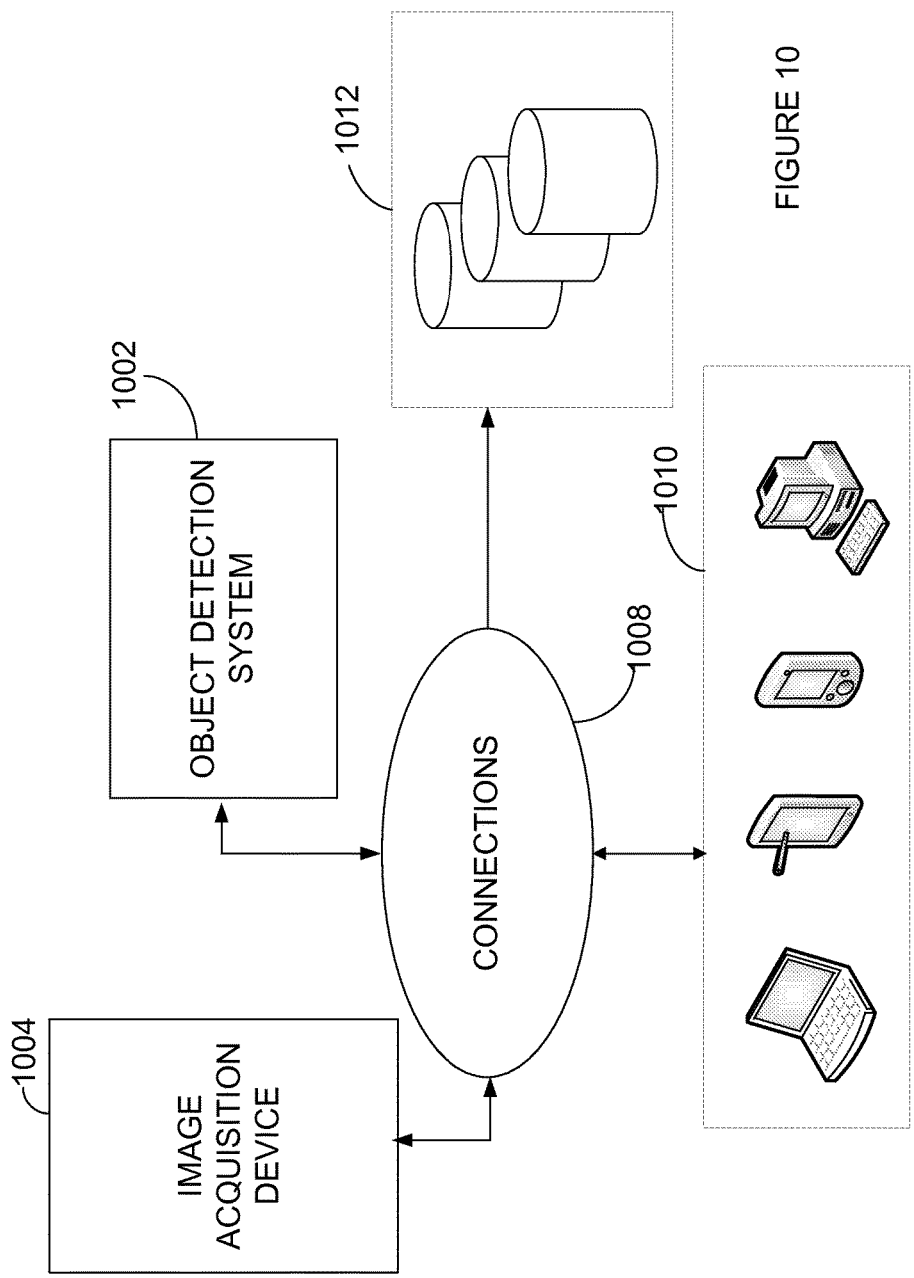
FIG. 10 is an exemplary set-up for an object detection system operatively coupled to an image acquisition device.
Figure 11:
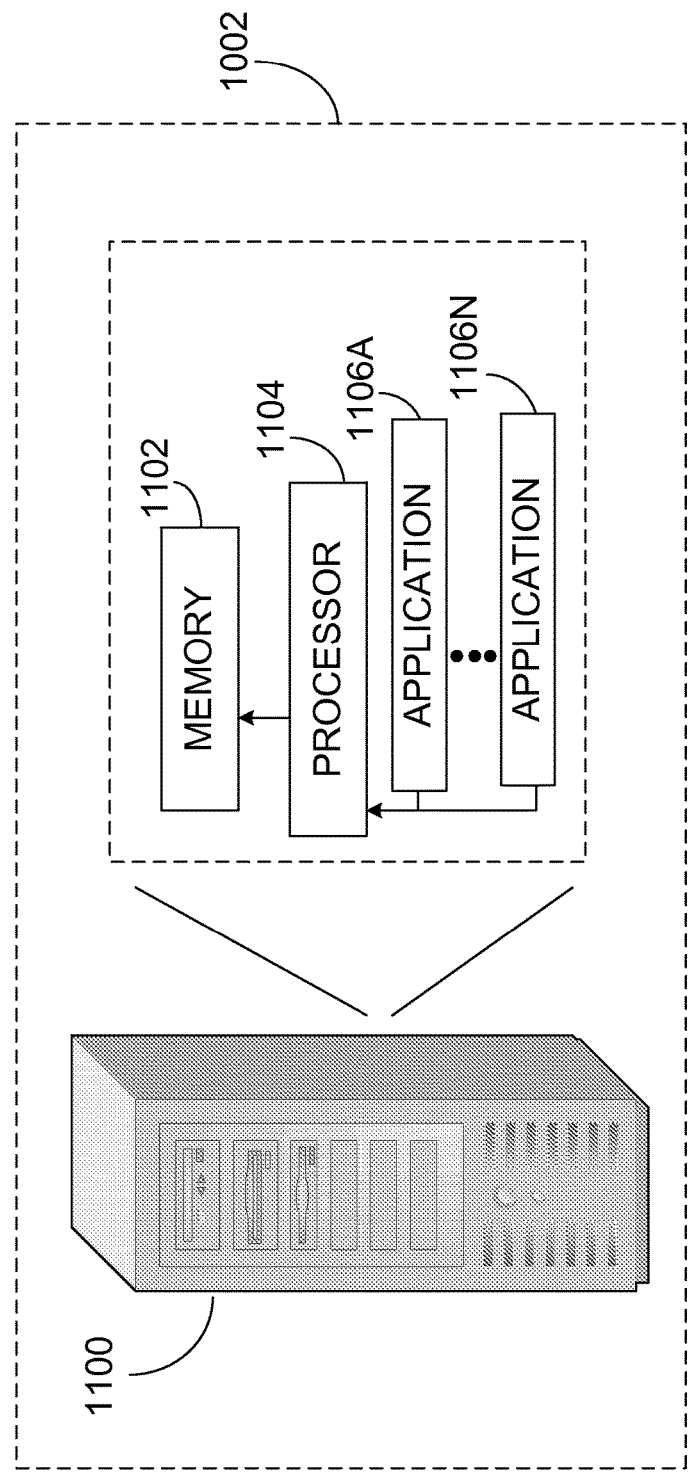
FIG. 11 is a block diagram of an exemplary object detection system.
Figure 12:
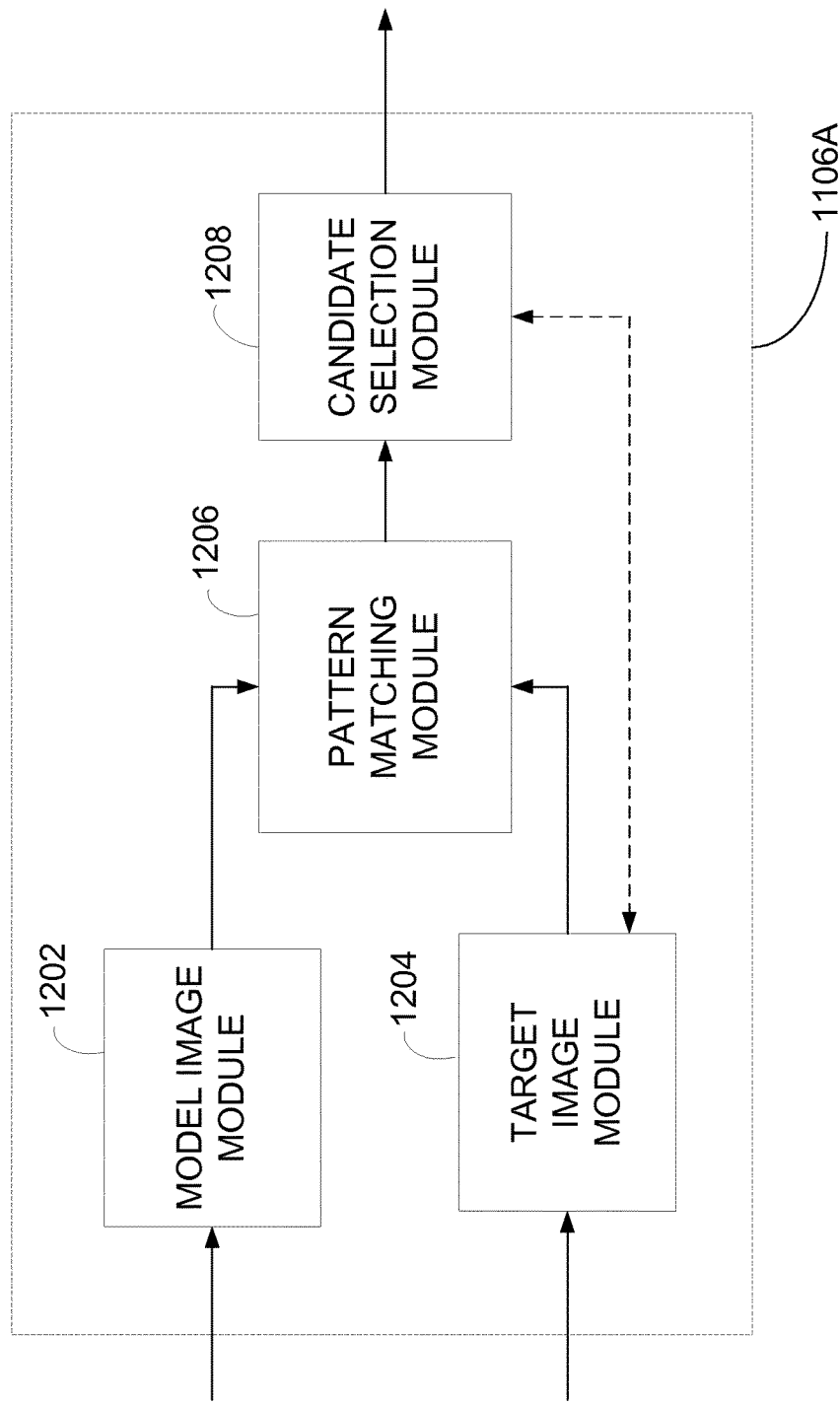
FIG. 12 is a block diagram of an exemplary application running on the processor of the object detection system of FIG. 10.

Referring to FIGS. 10 to 12, a system for detecting an object in an image will now be described. In FIG. 10, there is illustrated an object detection system 1002 operatively connected to an image acquisition device 1004. The image acquisition device 1004 may be provided separately from or incorporated within the object detection system 1002. For example, the object detection system 1002 may be integrated with the image acquisition device 1004 either as a downloaded software application, a firmware application, or a combination thereof. The image acquisition device 1004 may be any instrument capable of recording images that can be stored directly, transmitted to another location, or both. These images may be still photographs or moving images such as videos or movies.

Various types of connections 1008 may be provided to allow the object detection system 1002 to communicate with the image acquisition device 1004. For example, the connections 1008 may comprise wire-based technology, such as electrical wires or cables, and/or optical fibers. The connections 1008 may also be wireless, such as RF, infrared, Wi-Fi, Bluetooth, and others. Connections 1008 may therefore comprise a network, such as the Internet, the Public Switch Telephone Network (PSTN), a cellular network, or others known to those skilled in the art. Communication over the network may occur using any known communication protocols that enable devices within a computer network to exchange information. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The object detection system 1002 may be accessible remotely from any one of a plurality of devices 1010 over connections 1008. The devices 1010 may comprise any device, such as a personal computer, a tablet, a smart phone, or the like, which is configured to communicate over the connections 1008. In some embodiments, the object detection system 1002 may itself be provided directly on one of the devices 1010, either as a downloaded software application, a firmware application, or a combination thereof. Similarly, the image acquisition device 1004 may be integrated with one of the device 1010. In some embodiments, the image acquisition device 1004 and the object detection system 1002 are both provided directly on one of devices 1010, either as a downloaded software application, a firmware application, or a combination thereof.

One or more databases 1012 may be integrated directly into the object detection system 1002 or any one of the devices 1010, or may be provided separately therefrom (as illustrated). In the case of a remote access to the databases 1012, access may occur via connections 1008 taking the form of any type of network, as indicated above. The various databases 1012 described herein may be provided as collections of data or information organized for rapid search and retrieval by a computer. The databases 1012 may be structured to facilitate storage, retrieval, modification, and deletion of data in conjunction with various data-processing operations. The databases 1012 may be any organization of data on a data storage medium, such as one or more servers.

The databases 1012 illustratively have stored therein any one of model images, target images, model distance maps, target distance maps, selection criteria, pixel locations (i, j), grayscale intensity values G(i, j), distance values D(i, j), similarity values S(i, j), grayscale images G, binary images B, distance maps D, and similarity maps S.

As shown in FIG. 11, the object detection system 1002 illustratively comprises one or more server(s) 1100. For example, a series of servers corresponding to a web server, an application server, and a database server may be used. These servers are all represented by server 1100 in FIG. 11. The server 1100 may be accessed by a user, such as a technician or an assembly line worker, using one of the devices 1010, or directly on the system 1002 via a graphical user interface. The server 1100 may comprise, amongst other things, a plurality of applications 1106a . . . 1106n running on a processor 1104 coupled to a memory 1102. It should be understood that while the applications 1106a . . . 1106n presented herein are illustrated and described as separate entities, they may be combined or separated in a variety of ways.

The memory 1102 accessible by the processor 1104 may receive and store data. The memory 1102 may be a main memory, such as a high speed Random Access Memory (RAM), or an auxiliary storage unit, such as a hard disk, a floppy disk, or a magnetic tape drive. The memory 1102 may be any other type of memory, such as a Read-Only Memory (ROM), or optical storage media such as a videodisc and a compact disc. The processor 1104 may access the memory 1102 to retrieve data. The processor 1104 may be any device that can perform operations on data. Examples are a central processing unit (CPU), a front-end processor, a microprocessor, and a network processor. The applications 1106a . . . 1106n are coupled to the processor 1104 and configured to perform various tasks. An output may be transmitted to the image acquisition device 1004 and/or to the devices 1010.

FIG. 12 is an exemplary embodiment of an application 1106a running on the processor 1104. The application 1106a illustratively comprises a model image module 1202, a target image module 1204, a pattern matching module 1206, and a candidate selection module 1208. The model image module 102 receives and processes data with regards to the model object while the target image module 1204 receives and processes data with regards to the target image. The model image module 1202 illustratively receives input from the image acquisition device 1004, one of the devices 1010, or manually as entered by a user. The input may comprise parameters to define the model object, such as a minimum dimension, a shape, and/or a model image. The model image module 1202 may be configured to generate a model distance map from the input parameters. In some embodiments, the model image module 1202 may be configured to acquire a model image using the image acquisition device 1004, segment the model image if the acquired image is a non-segmented image, and apply a distance transform to generate the model distance map. The target image module 1204 illustratively receives input from the image acquisition device 1004, one of the devices 1010, or manually as entered by a user. The input may comprise the target image or instructions to retrieve/acquire the target image. For example, the target image may be stored in memory 1102 or in databases 1012 and an input is provided to the target image module 1204 to retrieve the target image. Alternatively, a user input may instruct the target image module 1204 to acquire the target image using the image acquisition device 1004. The target image module 1204 may be configured to segment a non-segmented target image and/or to apply a distance transform to a segmented target image in order to generate a target distance map.

The target image module 1204 and the model image module 1202 may be configured to provide the target distance map and the model distance map, respectively, to the pattern matching module 1206. The pattern matching module 1206 may be configured to perform pattern matching between the model distance map and the target distance map using a similarity score invariant to a constant offset to generate a similarity map, each pixel location (i, j) in the similarity map having a corresponding similarity value. As indicated above, the similarity score may be a normalized correlation, a normalized grayscale correlation, or any other similarity score having the property that it is invariant to a constant offset. The pattern matching module 1206 may be configured to provide the similarity map to the candidate selection module 1208. The candidate selection module 1208 may be configured to apply the at least one selection criterion to the similarity map and retain each pixel location (i, j) associated with the similarity value meeting the at least one selection criterion as a position for the detected instance of the object. In some embodiments, the candidate selection module 1208 may also be configured to, for each pixel location (i, j) retained as a position for a detected instance of the object, determine an approximate dimension for the detected instance based on the distance value corresponding to a center position of the detected instance. The candidate selection module 1208 may be configured to output the results of the object detection in various formats, such as providing the set of retained pixel locations (i, j), or overlaying the retained coordinates onto the target image. The candidate selection module 1208 may thus be operatively connected to the target image module 1204 in order to access the target image.

In some embodiments, the application 1106*a* is configured to repeat the pattern matching process for multiple orientations of the model or target image. For example, in some embodiments, the model image module 1202 is configured to generate a first model distance map for a first orientation of the model and generate a second model distance map for a second orientation of the model. Then, the pattern matching module 1206 is configured to perform pattern matching between the first model distance map and the target distance map to generate a first similarity map, and between the second model distance map and the target distance map to generate a second similarity map. The candidate selection module 1208 is configured to apply a selection criterion to the first similarity map and each pixel location (i, j) meeting the selection criterion is retained as a position for a detected instance of the object at the first orientation. The candidate selection module 1208 is also configured to apply a selection criterion to the second similarity map and each pixel location (i, j) meeting the selection criterion is retained as a position for a detected instance of the object at the second orientation. The application 1106*a* may be configured to detect a greater number of orientations of the model, as required by the expected range of orientations of the object in the target image and based on the degree of rotational symmetry of the object to be detected.

Other variants to the configurations of the model image module 1204, target image module 1204, pattern matching module 1206, and candidate selection module 1208 may also be provided and the example illustrated is simply for illustrative purposes.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for detecting an object in an image, the object exhibiting a property whereby a distance map of the object at a first scale and a distance map of the object at a second scale greater than the first scale differ by a constant value over a domain of the distance map of the object at the first scale, the method being scale invariant and comprising:
   generating a model distance map of a model of the object, the model having a minimum dimension;
   receiving a segmented target image of the object for detection, the object having a dimension equal to or greater than the minimum dimension;
   applying a distance transform to the segmented target image to generate a target distance map, each pixel location (i, j) in the target distance map having a corresponding distance value;
   performing pattern matching between the model distance map and the target distance map using a similarity score invariant to a constant offset to generate a similarity map invariant to a difference in dimension of the model and the object, each pixel location (i, j) in the similarity map having a corresponding similarity value; and
   applying at least one selection criterion to the similarity map and retaining each pixel location (i, j) associated with a similarity value meeting the at least one selection criterion as a position for a detected instance of the object.

2. The method of claim 1, wherein generating a model distance map comprises generating the model distance map for a rotationally symmetric object.

3. The method of claim 1, wherein generating a model distance map comprises generating the model distance map for a circle having a minimum radius.

4. The method of claim 1, wherein generating a model distance map comprises generating the model distance map for a regular polygon.

5. The method of claim 1, wherein performing pattern matching between the model distance map and the target distance map comprises using a normalized correlation.

6. The method of claim 5, wherein using a normalized correlation comprises using a square value of the normalized correlation.

7. The method of claim 1, wherein applying at least one selection criterion comprises identifying pixel locations (i, j) corresponding to local extrema in the similarity map and retaining each pixel location (i, j) having a corresponding similarity value that is consistent with a predetermined detection threshold.

8. The method of claim 1, further comprising, for each pixel location (i, j) retained as a position for a detected instance of the object, determining a center position of the detected instance and determining an approximate dimension for the detected instance based on the distance value corresponding to the center position.

9. The method of claim 1, wherein generating a model distance map comprises generating a first model distance map for a first orientation of the model and generating a second model distance map for a second orientation of the model;
wherein performing pattern matching comprises performing pattern matching between the first model distance map and the target distance map to generate a first similarity map and performing pattern matching between the second model distance map and the target distance map to generate a second similarity map; and
wherein applying at least one selection criterion to the similarity map comprises applying the at least one selection criterion to the first similarity map and retaining each pixel location (i, j) associated with a similarity value meeting the at least one selection criterion as a position for a detected instance of the object at the first orientation, and applying the at least one selection criterion to the second similarity map and retaining each pixel location (i, j) associated with a similarity value meeting the at least one selection criterion as a position for a detected instance of the object at the second orientation.

10. The method of claim 1, wherein generating a model distance map comprises generating a segmented model image and applying a distance transform to the segmented model image to generate the model distance map.

11. The method of claim 10, wherein generating a segmented model image comprises receiving a non-segmented model image and converting the non-segmented model image into the segmented model image.

12. The method of claim 1, wherein receiving a segmented target image comprises receiving a non-segmented target image acquired using an image acquisition device and converting the non-segmented target image into the segmented target image.

13. The method of claim 1, wherein generating a model distance map comprises generating a greyscale image version of the model distance map, wherein applying a distance transform to the segmented target image to generate a target distance map comprises generating a greyscale image version of the target distance map, and wherein performing pattern matching comprises using a normalized greyscale correlation.

14. A system for detecting an object in an image, the object exhibiting a property whereby a distance map of the object at a first scale and a distance map of the object at a second scale greater than the first scale differ by a constant value over a domain of the distance map of the object at the first scale, detection of the object being scale invariant, the system comprising:
a memory;
a processor; and
at least one application stored in the memory and executable by the processor for:
generating a model distance map of a model of the object, the model having a minimum dimension;
receiving a segmented target image of the object for detection, the object having a dimension equal to or greater than the minimum dimension;
applying a distance transform to the segmented target image to generate a target distance map, each pixel location (i, j) in the target distance map having a corresponding distance value;
performing pattern matching between the model distance map and the target distance map using a similarity score invariant to a constant offset to generate a similarity map invariant to a difference in dimension of the model and the object, each pixel location (i, j) in the similarity map having a corresponding similarity value; and
applying at least one selection criterion to the similarity map and retaining each pixel location (i, j) associated with a similarity value meeting the at least one selection criterion as a position for a detected instance of the object.

15. The system of claim 14, wherein generating a model distance map comprises generating the model distance map for a rotationally symmetric object.

16. The system of claim 14, wherein generating a model distance map comprises generating the model distance map for a circle having a minimum radius.

17. The system of claim 14, wherein generating a model distance map comprises generating the model distance map for a regular polygon.

18. The system of claim 14, wherein performing pattern matching between the model distance map and the target distance map comprises using a normalized correlation.

19. The system of claim 18, wherein using a normalized correlation comprises using a square value of the normalized correlation.

20. The system of claim 14, wherein applying at least one selection criterion comprises identifying pixel locations (i, j) corresponding to local extrema in the similarity map and retaining each pixel location (i, j) having a corresponding similarity value that is consistent with a predetermined detection threshold.

21. The system of claim 14, wherein the at least one application is further configured for, for each pixel location (i, j) retained as a position for a detected instance of the object, determining a center position of the detected instance and determining an approximate dimension for the detected instance based on the distance value corresponding to the center position.

22. The system of claim 14, wherein generating a model distance map comprises generating a first model distance map for a first orientation of the model and generating a second model distance map for a second orientation of the model;
wherein performing pattern matching comprises performing pattern matching between the first model distance map and the target distance map to generate a first similarity map and performing pattern matching between the second model distance map and the target distance map to generate a second similarity map; and wherein applying at least one selection criterion to the similarity map comprises applying the at least one selection criterion to the first similarity map and retaining each pixel location (i, j) associated with a similarity value meeting the at least one selection criterion as a position for a detected instance of the object at the first orientation, and applying the at least one selection criterion to the second similarity map and retaining each pixel location (i, j) associated with a similarity value meeting the at least one selection criterion as a position for a detected instance of the object at the second orientation.

23. The system of claim 14, wherein generating a model distance map comprises generating a segmented model image and applying a distance transform to the segmented model image to generate the model distance map.

24. The system of claim 23, wherein generating a segmented model image comprises receiving a non-segmented model image and converting the non-segmented model image into the segmented model image.

25. The system of claim 14, wherein receiving a segmented target image comprises receiving a non-segmented target image acquired using an image acquisition device and converting the non-segmented target image into the segmented target image.

26. The system of claim 14, wherein generating a model distance map comprises generating a greyscale image version of the model distance map, wherein applying a distance transform to the segmented target image to generate a target distance map comprises generating a greyscale image version of the target distance map, and wherein performing pattern matching comprises using a normalized greyscale correlation.

27. A non-transitory computer readable medium having stored thereon program code executable by a processor for detecting an object in an image, the object exhibiting a property whereby a distance map of the object at a first scale and a distance map of the object at a second scale greater than the first scale differ by a constant value over a domain of the distance map of the object at the first scale, detection of the object being scale invariant, the program code executable for:

generating a model distance map of a model of the object, the model having a minimum dimension;

receiving a segmented target image of the object for detection, the object having a dimension equal to or greater than the minimum dimension;

applying a distance transform to the segmented target image to generate a target distance map, each pixel location (i, j) in the target distance map having a corresponding distance value;

performing pattern matching between the model distance map and the target distance map using a similarity score invariant to a constant offset to generate a similarity map invariant to a difference in dimension of the model and the object, each pixel location (i, j) in the similarity map having a corresponding similarity value; and applying at least one selection criterion to the similarity map and retaining each pixel location (i, j) associated with a similarity value meeting the at least one selection criterion as a position for a detected instance of the object.

* * * * *